Sept. 25, 1962     H. PULFRICH     3,055,465

METAL-TO-CERAMIC JOINT AND METHOD OF FORMING

Filed April 3, 1957

INVENTOR
HANS PULFRICH
BY *Eric D. Frankel*

PATENT AGENT

United States Patent Office 3,055,465
Patented Sept. 25, 1962

3,055,465
METAL-TO-CERAMIC JOINT AND METHOD OF FORMING
Hans Pulfrich, Neu-Ulm (Danube), Germany, assignor to Telefunken G.m.b.H., Berlin, Germany
Filed Apr. 3, 1957, Ser. No. 650,497
Claims priority, application Germany Apr. 7, 1956
12 Claims. (Cl. 189—36.5)

The present invention relates to a method and structure for joining a non-metallic material, such as a ceramic, to metal.

A method has been suggested according to which metallic titanium is applied to the surface of non-metallic material to be joined and an intermediate layer of solder is added, for example, a silver solder, selected so that said intermediate layer makes possible a bonding of the surface of the non-metallic material to the titanium by forming an alloy.

The actual bonding takes place in such a manner that the parts to be joined are heated in an inert gas atmosphere or in a vacuum to a temperature at which the formation of the alloy between the titanium and the solder occurs.

In practice, care should be taken that the joint between the metal part and the non-metallic material is free of thermal stresses, because difficulties are often encountered in finding materials that can be joined by soldering, for example, titanium and forsterite ceramic, and which have equal thermal expansion coefficients within the temperature range required for the soldering. As compared to glass-metal joints, the solidification takes place at a substantially higher temperature, for example, at about 800° C. in case of metal-ceramic joints. The few equal-expansion materials to be soldered can be used on a practical basis only under certain conditions, since these materials are not sufficiently ductile and, therefore, are difficult to work. This is particularly true in case of metal titanium which, after drawing, can be worked only with difficulty and which requires a high vacuum or an inert gas atmosphere to be present during soldering to the other parts.

It is an object of the present invention to provide a method which makes it possible to use in a simple manner ductile and readily workable materials to be soldered, even if the coefficients of expansion do not match those of the non-metallic material, this method avoiding the aforementioned difficulties.

It is another object of the present invention to use for the metal part a ductile material, for example, iron, iron-nickel, iron-nickel-cobalt, the coefficient of expansion of which differs considerably from that of the non-metallic material within a temperature range up to the melting point of the solder, and by soldering the titanium between the metal part and the non-metallic material in the form of a separate insert of such thickness that it exclusively determines the thermal expansion properties within the range to be encountered by the metal ceramic joint.

The method according to the invention is particularly advantageous in case of so-called butt joints.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
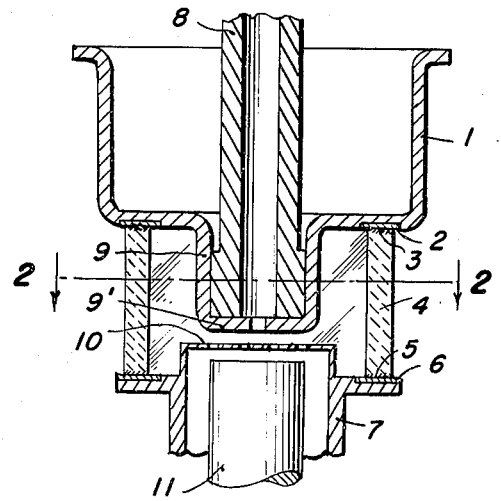
FIGURE 1 is a longitudinal section through a part of a triode tube and illustrating the metal-ceramic joints according to the invention.
Figure 2:
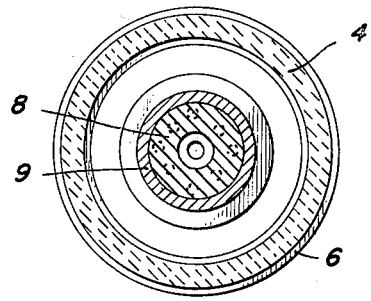
FIGURE 2 is a transverse sectional view along the line 2—2 of FIGURE 1.

The triode tube, shown in the drawing, with disc-shaped electrodes, has the exterior shape of a conventional tube and comprises a cup-shaped metal piece 1 and a metal member 7 for supporting a grid 10. A tubular ceramic jacket 4 serves to space the two metal parts 1 and 7, this ceramic jacket 4 being made of forsterite, i.e., magnesium silicate ceramic, which is a non-metallic material having thermal expansion properties which are approximately the same as those of titanium. Recesses for receiving inserts 2 and 6 of titanium are respectively provided in the cup-shaped piece 1 and in the metal member 7 supporting the grid 10. These inserts 2 and 6 serve to connect the ceramic part with the respective metal parts. An exhaust tube 8, known per se, is soldered in a cup-shaped extension 9 of the metal piece 1, said tube 8 being preferably made of copper and communicating with the inter-electrode space within the ceramic jacket 4 via an opening through the end wall of the extension 9 forming an anode 9' of the tube. The grid 10 and a disc-shaped cathode 11 are mounted there-adjacent at a small distance from the anode 9'.

The metal-ceramic joints can be obtained by stacking the parts 1, 2, 4, 6 and 7, and by inserting metal solder foils comprising, for example, silver, copper, or an eutectic mixture of silver-copper, between the metal piece 1 and the insert 2 of titanium, between the latter and the ceramic member 4, between the ceramic member 4 and the intermediate titanium insert 6, and between the latter and the metal member 7. The entire assembly is subsequently briefly heated by high frequency to such high temperature that the soldering metal becomes alloyed with the respective adjacent surfaces of titanium and forms rigid joints with the ceramic part and the associated metal parts.

In contrast to prior art methods, the metal parts 1 and 7 in the embodiment shown in the drawing may be made of any ductile material selected for technical reasons, such as iron, an iron-nickel alloy, or an iron-nickel-cobalt alloy. As stated above, the material may have expansion coefficients which are substantially different from those of the ceramic material. Furthermore, the titanium inserts 2 and 6 should be thick enough to prevent undesirable strains in the metal parts 1 and 7, due to thermal stresses, from transferring to the ceramic material during the cooling after solidification of the solder joints.

This result can be obtained, for example, by the use of forsterite as the ceramic material, an iron-nickel-cobalt alloy as the metal of the parts 1 and 7, and by providing a titanium insert having a thickness of about 0.5 mm. The soldering metal foils of which only those at the joints with the ceramic material at 3 and 5 are visible in FIGURE 1, may advantageously have thicknesses of less than 50μ.

In the example shown, the titanium inserts are placed in slightly recessed portions of the metal parts. This serves the purpose of easily centering the titanium inserts 2 and 6. These titanium inserts will be designed according to the prevailing requirements, i.e., they have a rather small radial width, as shown at 2. However, it is also possible, and in certain cases advantageous, to provide the titanium inserts with a larger radial width as, for example, shown in the titanium insert 6, which is much wider than is required by the radial width of the cylindrical wall of the ceramic jacket 4. Although, in the example shown, recesses are provided in the metal parts to receive the titanium inserts, it is possible to omit such recesses and to place the titanium inserts upon the surface of the metal part to be joined.

Instead of inserting the solder in the form of a foil, it is possible to apply the latter by deposition to the respective surfaces. Thus, it is possible, and the manufacture is thereby substantially simplified, to coat the titanium insert all over with a soldering layer, such as silver, copper or nickel, either by electroplating, or in any other manner. Such soldering layer may comprise two different solders which are deposited either successively or simultaneously on the titanium insert. The thickness of the soldering layer should be about 10 to 20μ. A titanium insert thus prepared can be used for joining of the metal piece with the ceramic part without insertion of further solder foils. If several soldering layers are applied, the desired soldering alloy, such as an eutectic mixture of silver and copper, is formed during the soldering operation.

In view of the high frequency operation, it is frequently necessary to finish the surface of the actual metal pieces 1 or 7 in tubes, such as those shown in the example, i.e., to apply on their surface a coating, for example, of copper, silver or gold. Such surface finishing is favorable for the use with the method according to the invention, because the finish-metal layer will simultaneously serve as a soldering ingredient at the titanium insert joint. Superior high frequency properties are obtained within the metal-ceramic joint, because the titanium will be only slightly dissolved on the surface of the soldering metal to form the alloy, whereby the superior high-frequency properties of the solder are retained. This assures that the surface finish is not destroyed during the actual soldering, for example, by melting, because the surface finish comprising titanium and solder which, in this special case, is the metal for the surface finishing, already results in a reliable soldering joint at a lower temperature than the melting temperature of the surface finish metal. If silver is used as the metal for the surface finishing and also as solder, a very reliable joint can be obtained at temperatures slightly above 900° C., whereby the soldering operation is carried out either in vacuum or in an inert gas atmosphere, such as argon. It is recommended to initially add to the solder proper small amounts of titanium in order to increase the difference between the melting point of the metal used for the surface finishing and the melting point of the alloy forming during the soldering operation. These additions of titanium may be in the order of about 1% in case of silver, and they are applicable also to other soldering metals.

I claim:

1. The method of forming a butt joint between a ductile metal part having one coefficient of thermal expansion and a ceramic part having a different coefficient of thermal expansion, including the steps of interposing a flat titanium insert having opposite sides whose areas are of a shape corresponding substantially to the shape of the butt joint, said insert having a coefficient substantially equal to that of the ceramic part and having a thickness sufficient that the thermal expansion of the insert at its surface adjacent the ceramic part is independent of the thermal expansion of the ductile metal part at the other surface of the insert, soldering the insert to said ductile metal part, and bonding the ceramic part to said insert.

2. The method according to claim 1, wherein said ductile metal part is iron.

3. The method according to claim 1, wherein said ductile metal part is an iron-nickel-alloy.

4. The method according to claim 1, wherein said ductile metal part is an iron-nickel-cobalt alloy.

5. In an electric discharge tube having at least one ductile metal part having one coefficient of thermal expansion, and having at least one ceramic part having a different coefficient of thermal expansion, a joint between said parts comprising a surface on said ductile metal part, an opposed surface on said ceramic part, and a flat titanium insert having a coefficient of thermal expansion substantially equal to that of said ceramic part, and said insert being coextensive with said surfaces and interposed therebetween, said insert being soldered to said ductile metal part and bonded to said ceramic part and being of sufficent thickness that its coefficient of expansion as encountered by said ceramic part is unaffected by the coefficient of expansion of the ductile metal part.

6. In a tube according to claim 5, said ductile metal part being of iron.

7. In a tube according to claim 5, said ductile metal part being an iron-nickel-alloy.

8. In a tube according to claim 5, said ductile metal part being an iron-nickel-cobalt-alloy.

9. In a tube according to claim 5, the surface of said ductile metal part being finished prior to forming of the joint by a deposited metal coating.

10. In a method of forming an annular butt joint in electric discharge tubes having disc-shaped electrodes, which joint joins an electrode part made of ductile metal having one coefficient of thermal expansion and a ceramic part having a different coefficient of thermal expansion, the steps of: soldering said electrode part to one annular surface of a flat titanium insert ring having opposite annular surfaces corresponding in shape substantially to that of the butt joint, said insert ring having a coefficient of thermal expansion substantially equal to that of the ceramic part and having a thickness sufficient that the thermal expansion of the insert ring at its other surface is independent of the thermal expansion of the electrode part at said one surface of said insert ring; and bonding said ceramic part to said insert ring.

11. The method according to claim 10, wherein said electrode part is made of a material selected from the group consisting of iron, iron-nickel alloys, and iron-nickel-cobalt alloys.

12. A method of making a butt joint between a ductile metal part having one coefficient of thermal expansion and a ceramic part having a different coefficient of thermal expansion, the steps of: soldering said ductile metal part to one surface of a flat titanium insert having opposite surfaces corresponding in shape substantially to that of the butt joint, said insert having a coefficient of thermal expansion substantially equal to that of the ceramic part and having a thickness sufficient that the thermal expansion of said insert at its other surface is independent of the thermal expansion of said ductile metal part at said one surface of said insert; and bonding said ceramic part to said insert.

References Cited in the file of this patent

UNITED STATES PATENTS

| | | |
|---|---|---|
| 584,750 | Scribner | June 15, 1897 |
| 2,163,409 | Pulfrich | June 20, 1939 |
| 2,230,205 | Rowland et al. | Jan. 28, 1941 |
| 2,279,831 | Lempert et al. | Apr. 14, 1942 |
| 2,283,705 | Stewart | May 19, 1942 |
| 2,340,362 | Atlee et al. | Feb. 1, 1944 |
| 2,449,759 | Barschdorf | Sept. 21, 1948 |
| 2,650,683 | McPhee et al. | Sept. 1, 1953 |
| 2,667,432 | Nolte | Jan. 26, 1954 |
| 2,677,781 | Drieschman | May 4, 1954 |
| 2,857,663 | Beggs | Oct. 28, 1958 |
| 2,859,512 | Dijksterhuis et al. | Nov. 11, 1958 |
| 2,962,136 | Pincus | Nov. 29, 1960 |
| 2,966,738 | Bertossa | Jan. 3, 1961 |